US012196287B2

(12) United States Patent
Koyama et al.

(10) Patent No.: US 12,196,287 B2
(45) Date of Patent: Jan. 14, 2025

(54) ELECTROMAGNETIC ACTUATOR

(71) Applicants: SUMITOMO RIKO COMPANY LIMITED, Komaki (JP); HONDA MOTOR CO., LTD., Tokyo (JP)

(72) Inventors: Hironori Koyama, Komaki (JP); Tomohiro Kanaya, Komaki (JP); Takaaki Shimizu, Tokyo (JP); Yasunori Kobayashi, Tokyo (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 829 days.

(21) Appl. No.: 17/001,840

(22) Filed: Aug. 25, 2020

(65) Prior Publication Data

US 2020/0386290 A1 Dec. 10, 2020

Related U.S. Application Data

(63) Continuation of application No. PCT/JP2019/020962, filed on May 27, 2019.

(30) Foreign Application Priority Data

Feb. 6, 2019 (JP) .................. 2019-019366

(51) Int. Cl.
*F16F 7/10* (2006.01)
*F16F 7/104* (2006.01)
(Continued)

(52) U.S. Cl.
CPC ............ *F16F 7/1011* (2013.01); *F16F 7/104* (2013.01); *H02K 33/16* (2013.01); *B62D 37/04* (2013.01);

(Continued)

(58) Field of Classification Search
CPC .......... F16F 7/1011; F16F 7/104; F16F 7/116; F16F 1/027; F16F 2222/08;
(Continued)

(56) References Cited

U.S. PATENT DOCUMENTS

2005/0218734 A1 10/2005 Tahara et al.
2005/0218745 A1* 10/2005 Suzuki .................. H02K 37/14
310/194

(Continued)

FOREIGN PATENT DOCUMENTS

JP H10-78079 A 3/1998
JP 2000-224798 A 8/2000
(Continued)

OTHER PUBLICATIONS

Mar. 9, 2023 Office Action issued in Chinese Patent Application No. 201980085426.2.

(Continued)

*Primary Examiner* — Thomas J Williams
(74) *Attorney, Agent, or Firm* — Oliff PLC

(57) ABSTRACT

An electromagnetic actuator including: a mover; a stator; at least one coil provided to the stator and arranged on an outer periphery of the mover, the coil being configured to be energized to generate an electromagnetic force that exerts a driving force on the mover; at least one yoke member surrounding the coil, the yoke member being constituted by a plurality of yoke segments; and a mold resin filling a space between the yoke segments and the coil, the mold resin fixing the yoke segments to each other. The mold resin extends to an outer peripheral surface of the yoke member and forms an outside resin layer.

10 Claims, 3 Drawing Sheets

(51) Int. Cl.
*H02K 33/16* (2006.01)
*B62D 37/04* (2006.01)

(52) U.S. Cl.
CPC ..... *F16F 2222/08* (2013.01); *F16F 2228/066* (2013.01); *F16F 2230/18* (2013.01); *F16F 2232/08* (2013.01); *F16F 2234/02* (2013.01)

(58) Field of Classification Search
CPC ............ F16F 2228/066; F16F 2230/18; F16F 2234/02; H02K 33/16; H02K 33/02; H02K 1/04; H02K 33/12; B62D 37/04
See application file for complete search history.

(56) References Cited

U.S. PATENT DOCUMENTS

| | | | | |
|---|---|---|---|---|
| 2005/0264117 | A1* | 12/2005 | Hata | H02K 5/1672 310/90 |
| 2008/0231134 | A1* | 9/2008 | Leiber | H02K 21/12 310/156.26 |
| 2011/0285484 | A1* | 11/2011 | Hoppe | H01F 7/081 335/229 |
| 2017/0292615 | A1* | 10/2017 | Schmitz | F02B 37/16 |
| 2017/0314632 | A1* | 11/2017 | Kanaya | H02K 5/24 |
| 2017/0328441 | A1* | 11/2017 | Kanaya | F16F 15/005 |
| 2020/0386290 | A1* | 12/2020 | Koyama | F16F 7/104 |

FOREIGN PATENT DOCUMENTS

| | | | |
|---|---|---|---|
| JP | 3684666 | B2 | 8/2005 |
| JP | 2009162361 | A * | 7/2009 |
| JP | 2011-109831 | A | 6/2011 |
| JP | 5496822 | B2 | 5/2014 |
| JP | 5780646 | B2 | 9/2015 |
| JP | 2018-98984 | A | 6/2018 |

OTHER PUBLICATIONS

Oct. 21, 2022 Office Action issued in Japanese Patent Application No. 2019-019366.
Aug. 10, 2021 International Preliminary Report on Patentability issued in International Patent Application No. PCT/JP2019/020962.
Jul. 9, 2019 International Search Report issued in International Patent Application No. PCT/JP2019/020962.

* cited by examiner

ELECTROMAGNETIC ACTUATOR

INCORPORATED BY REFERENCE

This application is a Continuation of International Application No. PCT/JP2019/020962 filed May 27, 2019, which claims priority under 35 U.S.C. §§ 119(a) and 365 of Japanese Patent Application No. 2019-019366 filed on Feb. 6, 2019, the disclosures of which are expressly incorporated herein by reference in their entireties.

BACKGROUND OF THE INVENTION

1. Field of the Invention

The present invention relates to an electromagnetic actuator that generates a driving force in a mover by electromagnetism.

2. Description of the Related Art

Conventionally, active vibration dampers and active vibration damping devices, which are called active type, have employed electromagnetic actuators in order to obtain an oscillation drive force. Such an electromagnetic actuator is proposed, for example, in Japanese Unexamined Patent Publication No. JP-A-2011-109831, in which an oscillation drive force is obtained by a mover displacing with respect to a stator provided with a coil due to an action of electromagnetic force.

Meanwhile, in JP-A-2011-109831, a metal core is provided around the coil to form a magnetic path. This core has a split structure comprising a first core and a second core, and by the first core being press-fitted into the second core, the core is formed so as to surround the coil.

SUMMARY OF THE INVENTION

However, research conducted by the inventors has revealed that the linear actuator described in JP-A-2011-109831 still had a problem to be solved. Specifically, in order to realize the core structure as described above, it was necessary to obtain high dimensional accuracy on the press-fitting surface by subjecting the first core to cutting process or the like. Thus, increase in processing labor and production cost was unavoidable.

In addition, because the electromagnetic actuator is exposed to vibration, there was a risk that the coil windings may be loosened due to vibration, and the loosened coil windings may come into contact with the metal core and cause an electrical short circuit.

Furthermore, since the outer peripheral surface of the core is in contact with the metal case, the leakage flux from the core tends to be large, and there was a risk that the energy efficiency of the oscillation drive force to be exhibited will be reduced.

It is therefore one object of this invention to provide an electromagnetic actuator of novel structure which is able to solve at least one of the aforementioned newly found problems.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides an electromagnetic actuator comprising: a mover; a stator; at least one coil provided to the stator and arranged on an outer periphery of the mover, the coil being configured to be energized to generate an electromagnetic force that exerts a driving force on the mover; at least one yoke member surrounding the coil, the yoke member being constituted by a plurality of yoke segments; and a mold resin filling a space between the yoke segments and the coil, the mold resin fixing the yoke segments to each other, wherein the mold resin extends to an outer peripheral surface of the yoke member and forms an outside resin layer.

According to the electromagnetic actuator structured following the present preferred embodiment, since the plurality of yoke segments are fixed by the mold resin and constitute the yoke member, there is no need to perform press-fitting and the necessary cutting process or the like as in the conventional structure. Therefore, it is possible to ease the dimensional accuracy required of the yoke member and to simplify the manufacturing equipment.

In addition, since mold resin fills the space between the yoke segments and the coil, an electrical short circuit caused by contact between the yoke segments and the coil windings is prevented. Furthermore, at least a part of the outer peripheral surface of the yoke member is covered by the outside resin layer comprising the mold resin, thereby reducing the leakage flux.

A second preferred embodiment of the present invention provides the electromagnetic actuator according to the first preferred embodiment, wherein the outside resin layer covers an entirety of the outer peripheral surface of the yoke member.

The electromagnetic actuator structured following the present preferred embodiment is able to cover the outer peripheral surface of the yoke member with the resin layer having low magnetic permeability. This makes it possible to further efficiently suppress the leakage of magnetic flux caused by the outside metal member or the like being arranged in close proximity to or in contact with the yoke member.

A third preferred embodiment of the present invention provides the electromagnetic actuator according to the first or second preferred embodiment, wherein the mover comprises a mass member, and the stator includes an attachment to a target member whose vibration is to be damped such that the electromagnetic actuator constitutes an active vibration damper with respect to the target member.

According to the electromagnetic actuator structured following the present preferred embodiment, an active vibration damper with respect to the target member can be realized by appropriately setting a mass of the mover and using the mover as a mass member. In the active vibration damper, the mover that constitutes a mass member may be held at a predetermined position with respect to a stator by magnetic force or the like. However, in preferred practice, a spring member that elastically connects the mover to the stator is used so that the mover constitutes a mass-spring system with respect to the stator. Such a mass-spring system can also be adopted to utilize amplification effect of the driving force by means of mass-spring resonance of the mover.

A fourth preferred embodiment of the present invention provides the electromagnetic actuator according to any one of the first through third preferred embodiments, wherein the at least one coil of the stator comprises a first coil and a second coil overlapped with each other in an axial direction, the at least one yoke member comprises a first yoke member which is constituted by the plurality of yoke segments while surrounding the first coil, and a second yoke member which is constituted by the plurality of yoke segments while surrounding the second coil, and the yoke segments of the first yoke member and the yoke segments of the second yoke member are fixed to one another by the mold resin.

According to the electromagnetic actuator structured following the present preferred embodiment, even in an embodiment including two or more coils comprising the first and second coils, not only the yoke segments formed around each of the coils but also the yoke segments that make up the yoke members in the mutually different coils can inclusively be fixed by the mold resin. As a result, it is possible to efficiently simplify the assembly structure and manufacturing process of the yoke member which tends to be more complicated due to the possession of two or more coils.

A fifth preferred embodiment of the present invention provides the electromagnetic actuator according to any one of the first through fourth preferred embodiments, wherein the yoke member includes a tube part located on an outer periphery of the coil, the tube part having a through hole, and the mold resin fills a radial inside of the tube part via the through hole.

According to the electromagnetic actuator structured following the present preferred embodiment, it is possible to efficiently fill the mold resin from the axially middle portion via the through hole. In addition, the fixing strength of the mold resin to the yoke member can be improved by the integration of the resin layers inside and outside the tube part.

A sixth preferred embodiment of the present invention provides the electromagnetic actuator according to any one of the first through fifth preferred embodiments, wherein the coil includes a power feed terminal that is conductive with respect to a coil wire, and a connector for external connection in which the power feed terminal is arranged is integrally formed by the mold resin.

According to the electromagnetic actuator structured following the present preferred embodiment, by integrally forming the connector by using the mold resin, in comparison with the case where the connector is separately formed and attached afterwards, improvement in strength of the components as well as reduction in labor and cost can be achieved.

A seventh preferred embodiment of the present invention provides the electromagnetic actuator according to any one of the first through sixth preferred embodiments, wherein the coil includes a resin bobbin around which a coil wire is wound, and the mold resin molded in a presence of the resin bobbin is fixed to the resin bobbin.

The electromagnetic actuator structured following the present preferred embodiment is able to position the coil with respect to the yoke member with ease and sufficient accuracy by using the resin bobbin. In addition, since the coil wire can also be covered from both radially inner and outer sides by the resin bobbin and the mold resin, an electrical short circuit caused by contact between the coil wire and other metal members can be more effectively prevented.

According to the electromagnetic actuator structured following the present invention, the plurality of yoke segments that constitute the yoke member are fixed by the mold resin, thereby simplifying the assembly structure of the yoke member to the coil. Besides, by skillfully utilizing such a mold resin, it is possible to prevent an electrical short circuit in the coil windings and to suppress leakage of magnetic flux from the yoke member to the outside or the like, for example.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

In order to clarify the present invention more specifically, practical embodiments of the present invention will be described in detail below in reference to the drawings.

Figure 1:
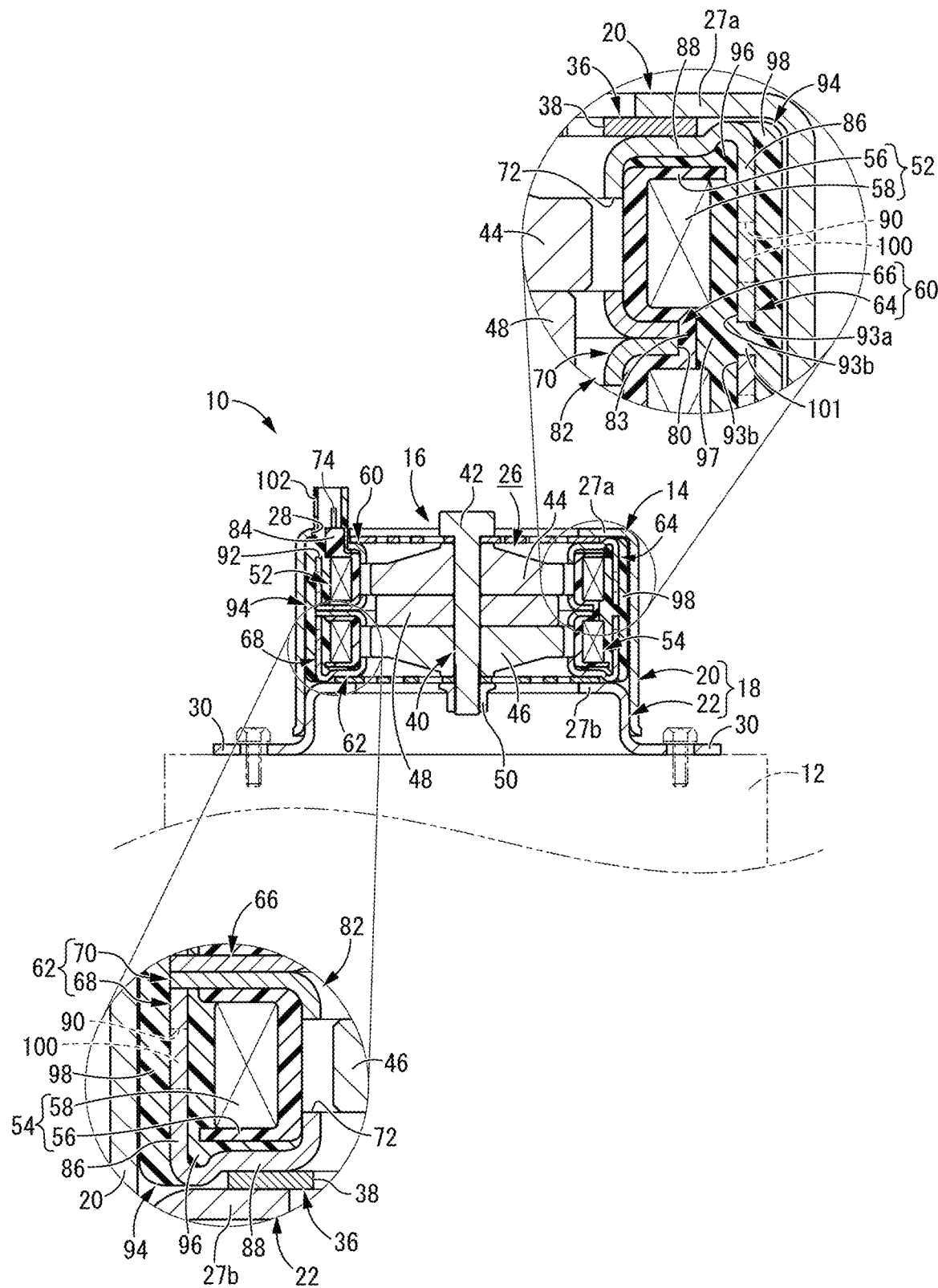
FIG. 1 is a vertical cross sectional view of an electromagnetic actuator according to a first practical embodiment of the present invention.

First, FIG. 1 shows an electromagnetic actuator 10 according to a first practical embodiment of the present invention. In the present practical embodiment, by being mounted onto a target member 12 whose vibration is to be damped, such as a vehicle body, the electromagnetic actuator 10 constitutes an active vibration damper that demonstrates an active vibration damping effect with respect to the target member 12. The electromagnetic actuator 10 includes a mover 16 serving as a mass member that is oscillated with respect to a stator 14 in the axial direction. In the following description, the vertical direction and the axial direction refer to the vertical direction in FIG. 1, which coincides with the center axial direction of the electromagnetic actuator 10.

Described more specifically, the electromagnetic actuator 10 includes a hollow housing 18. The housing 18 includes an outer tube member 20 and a bottom member 22, each of which has an inverted, generally round tubular shape with a bottom that opens downward. The housing 18 including a housing area 26 inside is constituted by a tube part of the bottom member 22 being press-fitted or inserted into the lower opening of the outer tube member 20 and being subjected to welding or the like as necessary.

In addition, upper base walls of the outer tube member 20 and the bottom member 22 are each penetrated by a circular through hole at its center portion in the vertical direction. As a result, the upper base walls of the outer tube member 20 and the bottom member 22 respectively define flanged parts 27a, 27b in the form of an annular disk.

In the present practical embodiment, in a part of the circumference of the flanged part 27a of the outer tube member 20 (the left side in FIG. 1), there is provided a generally rectangular insertion hole 28 that penetrates in the vertical direction. In addition, the bottom member 22 is provided with an annular rib that extends outward from the peripheral edge of the lower opening thereof, and a pair of attachments 30, 30 that protrude further outward are integrally formed with the outer peripheral edge of the annular rib. At the attachments 30, 30, the housing 18 is configured to be attached to the target member 12 with fixing bolts or the like.

Figure 2:
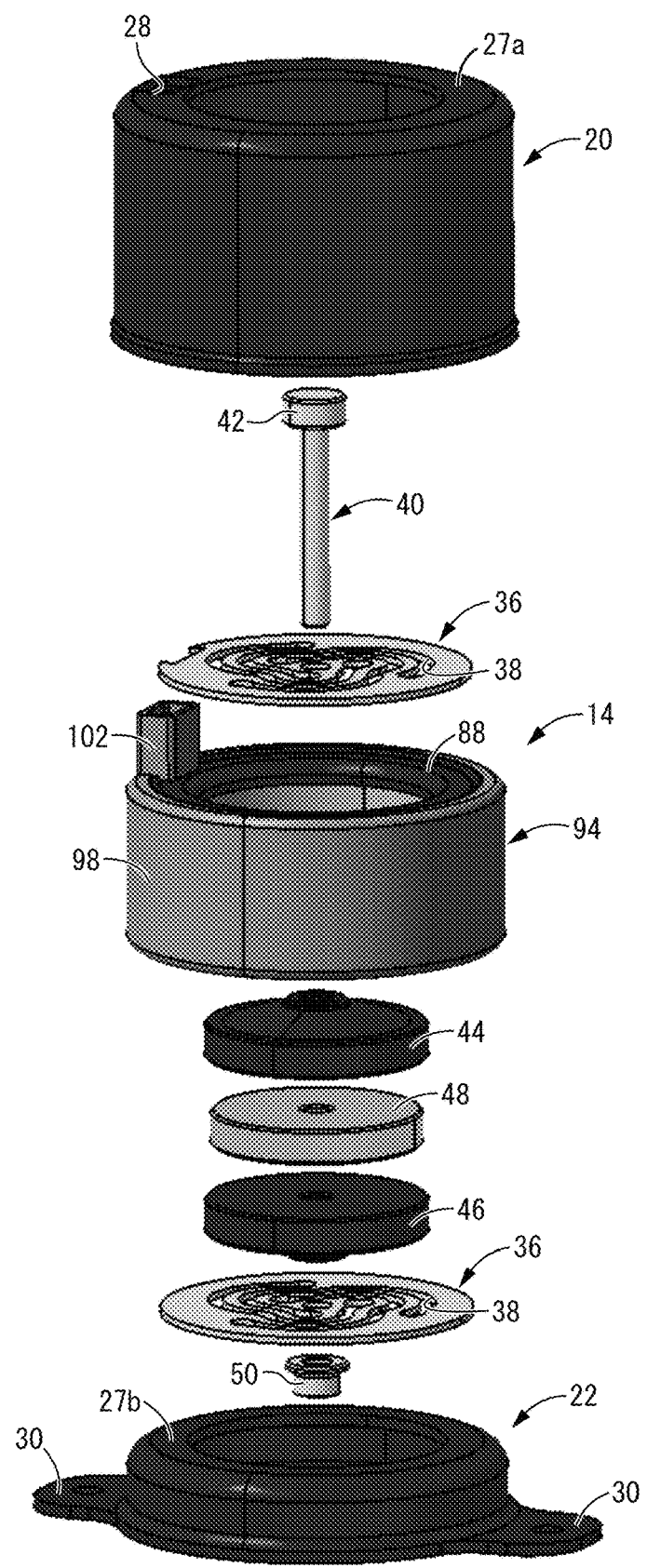
FIG. 2 is an exploded perspective view of the electromagnetic actuator shown in FIG. 1.

Inside the housing area 26, provided are the mover 16 disposed on the center axis of the outer tube member 20, and the stator 14 located on the outer peripheral side of the mover 16. These mover 16 and stator 14 are elastically connected to each other on both the upper and lower sides by leaf springs 36, 36 in the shape of a roughly annular disk. As shown in FIG. 2, in the present practical embodiment, according to the required spring characteristics, etc., there is formed a slit 38 that penetrates the leaf spring 36 in the vertical direction and extends in the circumferential direction in the form of, for example, a rough spiral.

The mover 16 serving as a mass member includes a generally rod-shaped inner shaft member 40 extending in the vertical direction in its center. The inner shaft member 40 includes a large-diameter head part 42 at its upper end, and a male screw part at its lower end.

Around the inner shaft member 40, an upper mass 44 and a lower mass 46 are externally fitted, and a permanent magnet 48 is externally fitted vertically between the upper and lower masses 44, 46. The permanent magnet 48 has a circular disk shape with a predetermined thickness, while the upper and lower masses 44, 46 are identical in shape but are vertically inverted with respect to each other, and have a roughly circular block shape protruding axially outward as it goes from the outer periphery toward the center. The opposed faces of the upper and lower masses 44, 46 having planar shapes are overlapped in contact with the corresponding upper and lower faces of the permanent magnet 48.

The upper and lower masses 44, 46 are made of ferromagnetic material such as iron with high magnetic permeability and form a magnetic path. The permanent magnet 48 is magnetized in the axial direction, and the axially upper and lower surfaces thereof are provided with the respective one of N and S magnetic poles. In addition, the lower end of the upper mass 44 and the upper end of the lower mass 46 both have an outer peripheral surface of round tubular shape protruding outward in the radial direction with an outside diameter dimension larger than that of the permanent magnet 48. With this configuration, the upper and lower masses 44, 46 constitute a yoke of the permanent magnet 48, and the outer peripheral surfaces of the upper and lower masses 44, 46 protruding outward in the radial direction above and below the permanent magnet 48 comprise external magnetic pole faces each having the same magnetic pole as the respective one of the upper and lower surfaces of the permanent magnet 48.

Thus, the upper leaf spring 36, the upper mass 44, the permanent magnet 48, the lower mass 46, and the lower leaf spring 36 are externally fitted onto the inner shaft member 40 in that order from the top, and a nut 50 is screwed to the male screw part at the lower end of the inner shaft member 40. With this arrangement, the central portions of the upper and lower leaf springs 36, 36, upper and lower masses 44, 46 and the permanent magnet 48 are securely supported to the inner shaft member 40 by being sandwiched vertically between the head part 42 of the inner shaft member 40 and the nut 50.

The stator 14 has a generally round tubular shape overall. The stator 14 includes a first coil 52 and a second coil 54 serving as coils arranged so as to be overlapped with each other in an upper-lower two-stage manner in the axial direction. The first coil 52 and the second coil 54 are each constituted by a conductive coil wire 58 being wound around a rigid resin bobbin 56 that opens to the radially outer side. A first yoke member 60 and a second yoke member 62 serving as yoke members are respectively arranged around the first coil 52 and the second coil 54. For example, a general magnet wire having a resin insulating film can be used as a coil wire.

The first yoke member 60 and the second yoke member 62 are made of a ferromagnetic material such as iron, and each have a split structure constituted by a plurality of yoke segments. That is, by being split into multiple parts, the yoke member can be attached to the coil later to form a magnetic path that surrounds the coil.

The first yoke member 60 includes an upper yoke segment 64 serving as a yoke segment that covers the first coil 52 from above, and a first middle yoke segment 66 serving as a yoke segment that covers the first coil 52 from below. The upper yoke segment 64 covers the outer peripheral surface and the upper surface of the first coil 52 roughly entirely, and covers a part of the radially inner surface (the upper end portion) of the first coil 52 from above. The first middle yoke segment 66 covers the lower surface of the first coil 52 roughly entirely, and covers a part of the radially inner surface (the lower end portion) of the first coil 52 from below.

The second yoke member 62 includes a lower yoke segment 68 serving as a yoke segment that covers the second coil 54 from below, and a second middle yoke segment 70 serving as a yoke segment that covers the second coil 54 from above. The lower yoke segment 68 covers the outer peripheral surface and the lower surface of the second coil 54 roughly entirely, and covers a part of the radially inner surface of the second coil 54 from below. The second middle yoke segment 70 covers the upper surface of the second coil 54 roughly entirely, and covers a part of the radially inner surface of the second coil 54 from above.

Around the first and second coils 52, 54, a magnetic path to guide a magnetic flux generated through energization to the coil wire 58 is formed by the first and second yoke members 60, 62. On the radial insides of the first coil 52 and the second coil 54, the radially inner edges of the upper yoke segment 64 and the first middle yoke segment 66, and the radially inner edges of the lower yoke segment 68 and the second middle yoke segment 70, are opposed to each other at a predetermined distance in the axial direction. Accordingly, on the aforementioned magnetic path, there are formed magnetic gaps 72, 72 respectively between axially opposed faces of the upper yoke segment 64 and the first middle yoke segment 66, and between axially opposed faces of the lower yoke segment 68 and the second middle yoke segment 70. Each magnetic gap 72 extends about the entire circumference in the circumferential direction with an approximately constant vertical distance.

Then, the magnetic flux is generated around the first and second coils 52, 54 owing to power feed from the outside to the first and second coils 52, 54 through a power feed terminal 74 that is conductive with respect to the coil wire 58 that constitutes the first coil 52. In addition, the generated magnetic flux is guided by the magnetic path constituted by the first and second yoke members 60, 62, so as to form the magnetic poles on vertically both sides of the magnetic gaps 72, 72.

In the present practical embodiment, the coil wire 58 of the first coil 52 and the coil wire 58 of the second coil 54 are wound around the resin bobbins 56, 56 in the adverse directions relative to each other, thereby generating magnetic fluxes in the adverse directions through the energization. It should be noted that the coil wires 58, 58 of the first and second coils 52, 54 may be wired continuously in series with each other.

The outer peripheral portions of the leaf springs 36, 36 are secured on vertically both sides of such stator 14. Specifically, the outer peripheral portion of the upper leaf spring 36 is sandwiched and supported vertically between the upper yoke segment 64 and the upper base wall (the flanged part 27a) of the outer tube member 20. Meanwhile, the outer peripheral portion of the lower leaf spring 36 is sandwiched and supported vertically between the lower yoke segment 68 and the upper base wall (the flanged part 27b) of the bottom member 22.

The mover 16, the stator 14, and the leaf spring 36, 36 are accommodated inside the outer tube member 20, and then accommodated within the housing area 26 of the housing 18 by the bottom member 22 being secured to the lower opening part of the outer tube member 20. By so doing, the outer peripheral portions of the leaf springs 36, 36 and the first and second yoke members 60, 62 having the first and second coils 52, 54 inside are sandwiched and supported vertically between the upper base wall (the flanged part 27a) of the outer tube member 20 and the upper base wall (the flanged part 27b) of the bottom member 22. As a result, the stator 14 is secured in a vertically positioned state with respect to the housing 18, and the attachments 30 to the target member 12 is indirectly provided with respect to the stator 14 via the housing 18 (the bottom member 22).

In such an assembly state, the magnetic pole faces provided on the outer peripheral surfaces of the upper and lower masses 44, 46 are radially opposed to the respective magnetic gaps 72, 72 provided on the radial insides of the first and second coils 52, 54.

With this configuration, when a magnetic field is generated in the upper and lower magnetic gaps 72, 72 through energization to the first and second coils 52, 54 of the stator 14, an axial magnetic attractive force is exerted on the outer peripheral portion of one of the upper and lower masses 44 (46), while an axial magnetic repulsive force is exerted on the outer peripheral portion of the other of the upper and lower masses 46 (44). Based on the action of these magnetic forces, the mover 16 is subjected to a driving force in one of the axial directions depending on the direction of energization to the first and second coils 52, 54. That is, by controlling the interval and direction of energization to the first and second coils 52, 54, it is possible to exert an axial oscillation force on the mover 16 and hence the inner shaft member 40 by prescribed periods.

In the present practical embodiment, the mover 16 is held in the initial axial position relative to the stator 14 by the elasticity of the upper and lower leaf springs 36, 36, and the mover 16 quickly returns to the initial position when the driving force by the power supply from the outside is cancelled.

Also, in the present practical embodiment, the electromagnetic actuator 10 is configured as an active vibration damper by being secured to the target member 12, such as a vehicle body, by bolting or the like via the attachment 30 provided on the outer peripheral surface of the outer tube member 20. That is, the housing 18 and the stator 14 are securely attached to the target member 12 such as a vehicle body, which is the primary vibration system, and the mover 16 is elastically connected to the housing 18 and the stator 14 via the leaf springs 36, 36, so as to constitute a mass-spring system, which is the secondary vibration system.

Then, with the active vibration damper (the electromagnetic actuator 10) mounted onto the target member 12, by controlling the power supply to the first and second coils 52, 54 depending on the axial vibration to be damped, it is possible to oscillate the mover 16 and inner shaft member 40 constituting the secondary vibration system thereby obtaining the desired vibration damping effect.

Here, the first and second middle yoke segments 66, 70 of the present practical embodiment are mutually identical in the shape of generally annular disk. The first and second middle yoke segments 66, 70 have a generally flat-plate shape overall, and their radially inner edges are bent in the axial direction to form the magnetic gaps 72, 72 in cooperation with the radially inner edges of the upper yoke segment 64 and the lower yoke segment 68.

In each outer peripheral edge of the first and second middle yoke segments 66, 70, there is formed a notch 80 in a part of its circumference (the right side in FIG. 1) so as to penetrate in the vertical direction and open to the radially outer side. That is, at the formation positions of the notches 80, 80, the outside diameter dimensions of the first and second middle yoke segments 66, 70 are reduced. The first and second middle yoke segments 66, 70 are vertically inverted with respect to each other and overlapped, and the upper and lower notches 80, 80 are aligned in the circumferential direction and communicate with each other in the vertical direction. Note that the first and second middle yoke segments 66, 70 may be temporarily secured to each other by adhesion, welding, or the like.

Figure 3:
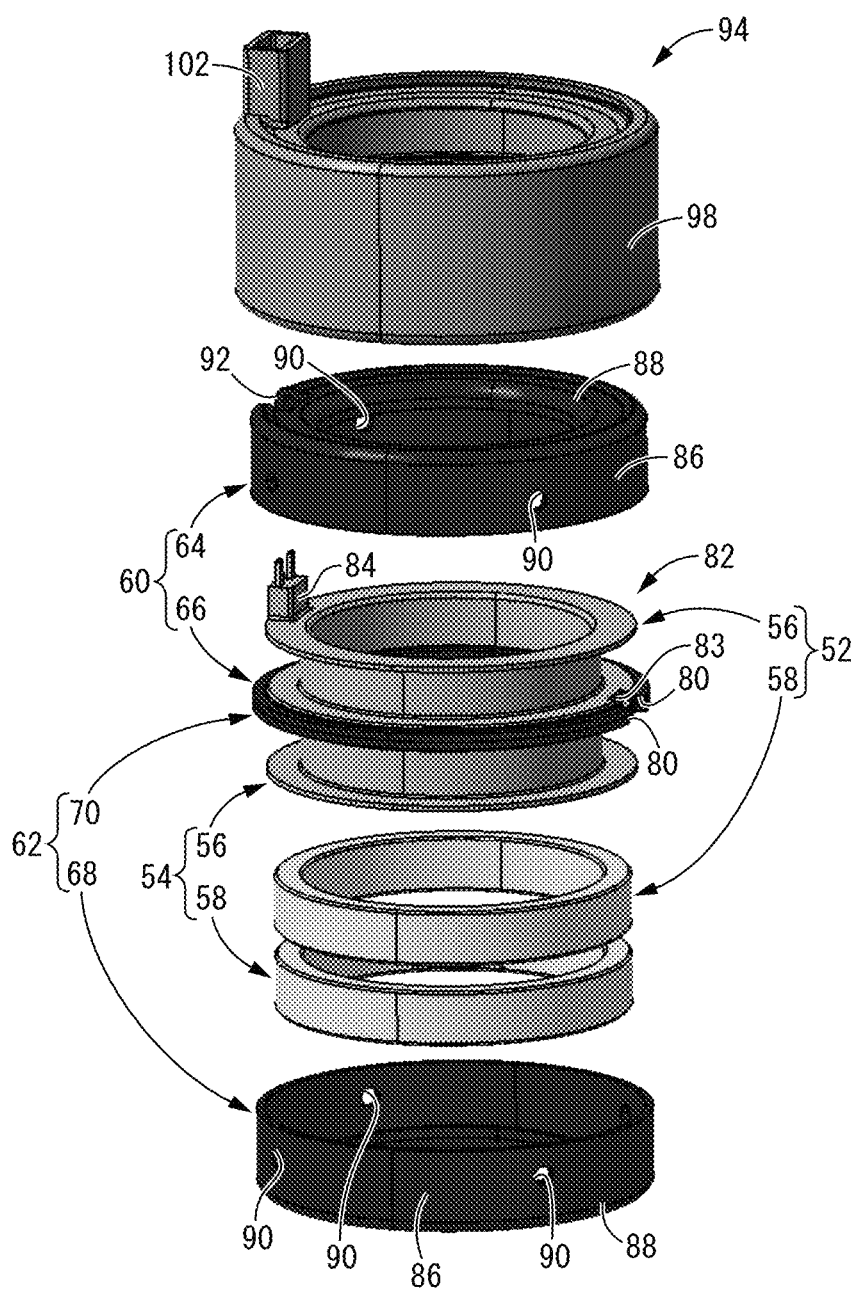
FIG. 3 is an exploded perspective view showing a stator that constitutes the electromagnetic actuator shown in FIG. 1.

The resin bobbins 56, 56 are overlapped on the axially outer side of these first and second middle yoke segments 66, 70. In the present practical embodiment, as shown in FIG. 3, the resin bobbins 56, 56 and the first and second middle yoke segments 66, 70 are integrally formed with one another. That is, by setting the first and second middle yoke segments 66, 70 in a mutually overlapped state in a cavity, and performing molding by injecting a resin material into the cavity, the resin bobbins 56, 56 are formed as a primary molded component 82 including the first and second middle yoke segments 66, 70.

In the primary molded component 82, the upper and lower resin bobbins 56, 56 are linked and formed as an integral unit by a linking resin 83 that wraps around the bottom face of the upper and lower notches 80, 80. In the primary molded component 82, in the resin bobbin 56 that constitutes the first coil 52, a terminal part 84 to which the power feed terminal 74 is fixed is integrally formed and protrudes upward.

In this primary molded component 82, the outer peripheral ends of the first and second middle yoke segments 66, 70, except for the formation position of the notches 80, 80, protrude to the radially outer side of the resin bobbin 56, 56. The coil wires 58, 58 are wound around the resin bobbins 56, 56 of the primary molded component 82, and the upper yoke segment 64 and the lower yoke segment 68 are arranged from the vertically outside of the coil wires 58, 58. Incidentally, in FIG. 3, the coil wires 58, 58 in the wound state are shown separately from the primary molded component 82. However, the coil wires 58, 58 can be wound simultaneously with the formation of the first and second coils 52, 54 by, for example, winding the coil wires 58, 58 around the respective resin bobbins 56, 56 of the primary molded component 82.

The upper yoke segment 64 and the lower yoke segment 68 include respective tube parts 86, 86 located on the outer peripheral side of the first and second coils 52, 54 and extending about the entire circumference in the circumferential direction. The tube parts 86, 86 include respective annular parts 88, 88 protruding radially inward from the vertically outer ends thereof. In the radially middle portions of the annular parts 88, 88, respective stepped parts are provided, so that the outer peripheral portions of the leaf spring 36, 36 are overlapped on the respective stepped parts. Besides, the radially inner edges of the annular parts 88, 88 are bent inward in the vertical direction to form the magnetic gaps 72, 72 in cooperation with the radially inner edges of the first and second middle yoke segments 66, 70.

The tube parts 86, 86 of the upper yoke segment 64 and the lower yoke segment 68 each have through holes 90 penetrating the vertically middle portion thereof in the thickness direction (the radial direction of the tube part 86). In the present practical embodiment, a plurality of through holes 90 are formed at approximately equal intervals in the circumferential direction. In the tube part 86 and the annular part 88 that constitute the upper yoke segment 64, a notch 92 that penetrates the upper yoke segment 64 in the radial and vertical directions is formed at the position corresponding to the insertion hole 28 of the outer tube member 20 in the circumferential direction.

Then, the upper yoke segment 64 and the lower yoke segment 68 are externally placed from the vertically outside around the primary molded component 82 around which the coil wires 58, 58 are wound. In this state, except for the formation position of the notches 80, 80, the vertically inner ends of the tube part 86, 86 are in contact with the outer peripheral ends of the first and second middle yoke segments 66, 70 that protrude from the resin bobbins 56, 56 to the radially outer side. In addition, at the formation position of the notches 80, 80, the linking resin 83 located on the bottom faces of the notches 80, 80 does not reach the upper and lower tube parts 86, 86 in the radial direction. With this configuration, a gap 93a is formed between the vertically opposed ends of the tube parts 86, 86, while gaps 93b, 93b are formed radially between the linking resin 83 and the tube parts 86, 86.

In addition, the tube parts 86, 86 are located on the outer peripheral side of the first and second coils 52, 54 at a predetermined distance therefrom. Furthermore, the annular parts 88, 88 are located vertically outside of the first and second coils 52, 54 at a predetermined distance therefrom. Accordingly, annular spaces are formed radially between the tube parts 86, 86 and the first and second coils 52, 54, and vertically between the annular parts 88, 88 and the first and second coils 52, 54.

A synthetic resin fills such a space between the first coil 52 and the upper yoke segment 64 and a space between the second coil 54 and the lower yoke segment 68. Then, the upper yoke segment 64 and the first middle yoke segment 66, as well as the lower yoke segment 68 and the second middle yoke segment 70, are fixed to each other by the synthetic resin to form the first and second yoke members 60, 62.

In the present practical embodiment, the primary molded component 82 around which the coil wires 58, 58 are wound, the upper yoke segment 64, and the lower yoke segment 68 are set in the cavity, and in that state, the resin material is injected into the cavity and molding is performed, thereby filling the insides of the first and second yoke members 60, 62 with the synthetic resin. That is, the synthetic resin that fills the space between the first coil 52 and the upper yoke segment 64 as well as the space between the second coil 54 and the lower yoke segment 68, and the synthetic resin that mutually fixes the upper yoke segment 64 and the first middle yoke segment 66 as well as the lower yoke segment 68 and the second middle yoke segment 70, serve as a mold resin 94. With this configuration, in the present practical embodiment, inside resin layers 96, 96 filling the first and second yoke members 60, 62 are constituted by the mold resin 94. While a rigid synthetic resin is preferably adopted as the mold resin 94, it need not be the same as the synthetic resin that constitutes the primary molded component 82 (the resin bobbins 56, 56).

This mold resin 94 is injected from the radially outer side of the first and second yoke members 60, 62, so as to fill the radial insides of the tube parts 86, 86 via the through holes 90, 90 provided in the tube parts 86, 86, the gap 93a between the tube parts 86, 86 and the gaps 93b, 93b between the tube parts 86, 86 and the linking resin 83. With this configuration, within the first and second yoke members 60, 62, the mold resin 94 (the inside resin layers 96, 96) is fixed to the resin bobbins 56, 56 so as to cover their openings to the radially outer side. In addition, the inside resin layers 96, 96 filling the first and second yoke members 60, 62 are linked with each other by a connecting resin 97 comprising the mold resin 94 at the formation position of the notches 80, 80, and the connecting resin 97 is fixed to the outer peripheral surface of the linking resin 83 integrally formed with the resin bobbins 56, 56.

Moreover, the mold resin 94 extends to the outer peripheral surface of the first and second yoke members 60, 62, so that an outside resin layer 98 is formed and fixed to cover the outer peripheral surfaces of the first and second yoke members 60, 62. That is, the inside resin layers 96, 96 filling the insides of the first and second yoke members 60, 62 and the outside resin layer 98 covering the outer peripheral surfaces of the first and second yoke members 60, 62 are linked and integrally formed with each other by filling resins 100, 100 filling the insides of the through holes 90, 90. Furthermore, the inside resin layers 96, 96 and the outside resin layer 98 are also linked with each other by the connecting resin 97 connecting the inside resin layers 96, 96, and by a filling resin 101 filling the inside of the gap 93a.

In the present practical embodiment, the outside resin layer 98 covers the entirety of the outer peripheral surfaces of the first and second yoke members 60, 62. Accordingly, the upper and first middle yoke segments 64, 66, which constitute the outer peripheral surface of the first yoke member 60, and the lower and second middle yoke segments 68, 70, which constitute the outer peripheral surface of the second yoke member 62, are fixed to one another by the mold resin 94 (the outside resin layer 98). Besides, the inside resin layers 96, 96 filling the insides of the first and second yoke members 60, 62 are connected with each other by the connecting resin 97. Thus, the upper and first middle yoke segments 64, 66, which constitute the first yoke member 60, and the lower and second middle yoke segments 68, 70, which constitute the second yoke member 62 are fixed to one another by the mold resin 94 (the inside resin layer 96 and the connecting resin 97). Then, the first and second middle yoke segments 66, 70, which respectively constitute the first and second yoke members 60, 62, can be secured to each other by these inside resin layers 96, 96 and outside resin layer 98. However, in the present practical embodiment, since the linking resin 83 straddling the first and second middle yoke segments 66, 70 is provided, the first and second middle yoke segments 66, 70 may be secured to each other by the linking resin 83.

Then, the mold resin 94 is formed as an integral unit including the first and second coils 52, 54 and the first and second yoke members 60, 62, thereby providing the stator 14 serving as a secondary molded component. Since the secondary molded component (the stator 14) is integrally formed, the mold resin 94 does not exist by itself as shown in FIG. 3, but is shown by itself in FIG. 3 to show the shape of the mold resin 94 in an easy-to-understand way.

In the present practical embodiment, a connector 102 for external connection, in which the power feed terminal 74 is arranged, is integrally formed at the upper end of the mold resin 94. The connector 102 is formed so as to cover the terminal part 84 that protrudes upward through the notch 92 of the upper yoke segment 64, and is inserted into the insertion hole 28 of the outer tube member 20 so as to protrude to the outside of the electromagnetic actuator 10.

The outside diameter dimension of the secondary molded component (the stator 14) as described above is slightly smaller than the inside diameter dimension of the outer tube member 20, and the stator 14 is inserted without being press-fitted into the outer tube member 20 in the state of being elastically connected with the mover 16.

In the electromagnetic actuator 10 according to the present practical embodiment with the structure as described above, in the first and second yoke members 60, 62 which have a split structure, the upper yoke segment 64 and the first middle yoke segment 66 are fixed by the mold resin 94, and the lower yoke segment 68 and the second middle yoke segment 70 are fixed by the mold resin 94. Therefore, when the first and second yoke members 60, 62 are placed around the first and second coils 52, 54 respectively, there is no need to perform press-fitting or cutting for the press-fitting, thereby reducing the labor and cost. In particular, since the upper yoke segment 64 and the first middle yoke segment 66, and the lower yoke segment 68 and the second middle yoke segment 70 are fixed from both inside and outside by the inside resin layer 96 and the outside resin layer 98, respectively, stable fixing force can be obtained.

In addition, the gap between the first yoke member 60 and the first coil 52 and the gap between the second yoke member 62 and the second coil 54 are filled with the mold resin 94. Thus, during vibration input from the outside or the like, contact between the first and second yoke members 60, 62 and the respective coil wires 58, 58 is prevented, thereby avoiding an electrical short circuit. In particular, in the present practical embodiment, the mold resin 94 is fixed to the resin bobbin 56 from the outside of the coil wire 58 so as to cover the opening to the radially outer side of the resin bobbin 56 around which the coil wire 58 is wound. This makes it possible to more reliably prevent the contact between the coil wires 58 and the first and second yoke members 60, 62.

Furthermore, since the outer peripheral surfaces of the first and second yoke members 60, 62 are covered by the outside resin layer 98, a gap between the outer peripheral surfaces of the first and second yoke members 60, 62 and the outer tube member 20 can be stably set, thereby preventing the two members from excessively approaching or directly contacting each other. Therefore, leakage of the magnetic flux generated around the first and second coils 52, 54 to the outside through the first and second yoke members 60, 62 and the outer tube member 20 can be avoided, or an amount of the leakage can be minimized. In particular, in the present practical embodiment, since the outer peripheral surfaces of the first and second yoke member 60, 62 are covered by the outside resin layer 98 roughly entirely, the leakage flux can be reduced more reliably.

Furthermore, the inside and outside resin layers 96, 98 are fixed to the first and second yoke members 60, 62. Thus, the upper and first middle yoke segments 64, 66 that constitute the first yoke member 60 and the lower and second middle yoke segments 68, 70 that constitute the second yoke member 62 are fixed to one another by the inside and outside resin layers 96, 98. Therefore, the positioning of the first and second yoke members 60, 62 can be easily achieved, and the misalignment of each segment 64, 66, 68, 70 which constitute the first and second yoke members 60, 62 can also be prevented.

In addition, filling of the mold resin 94 into the insides of the first and second yoke members 60, 62 is achieved via the through holes 90 provided in the tube parts 86, 86 on the radially outer side of the first and second coils 52, 54 and via the gap 93a between the tube parts 86, 86. Note that the through holes 90 for filling the mold resin 94 are provided in the outer peripheral portions of the first and second yoke members 60, 62. Accordingly, in comparison with the case where, for example, the through holes are provided in the upper parts of the first and second yoke members 60, 62 (the annular part 88 and the second middle yoke segment 70), filling of the mold resin 94 can be performed more quickly, and it is possible to prevent the outside resin layer 98 that covers the outer surfaces of the first and second yoke members 60, 62 from becoming unnecessarily large.

Moreover, in the present practical embodiment, the connector 102 in which the power feed terminal 74 is arranged is integrally formed with the mold resin 94. Thus, the labor and cost can be reduced in comparison with the case where the connector is separately formed.

Although the practical embodiment of the present invention has been described above, the present invention is not limitedly interpreted based on the specific or restrictive description in the practical embodiment and in the summary section, but may be embodied with various changes, modifications and improvements which may occur to those skilled in the art.

For example, in the preceding practical embodiment, securing of the upper yoke segment 64 and the first middle yoke segment 66, as well as the lower yoke segment 68 and the second middle yoke segment 70, which are the yoke segments, is achieved only by fixing with the mold resin 94. However, it would also be acceptable to adopt not only the fixing with mold resin 94, but also fixing force, detaining force or the like of each segment concomitantly.

Also, in the preceding practical embodiment, the outside resin layer 98 is fixed by covering the outer peripheral surface of the yoke member (the first and second yoke members 60, 62) roughly entirely, but may adopt an embodiment that partially covers the outer peripheral surface of the yoke member.

Moreover, in the preceding practical embodiment, the through holes 90 for filling the mold resin 94 inside the yoke member (the first and second yoke members 60, 62) are provided in the respective tube parts 86, 86 on the outer peripheral side of the coil (the first and second coils 52, 54). However, the present invention is not limited to such embodiment. Specifically, the through hole may be provided in the upper or lower wall of the yoke member (for example, the annular parts 88, 88 of the upper yoke segment 64 and the lower yoke segment 68). Besides, in the preceding practical embodiment, filling of the mold resin 94 into the inside of the yoke member is also achieved by the gap 93a between the tube parts 86, 86, but it would also be possible to only provide either of the through holes 90 and the gap 93a.

Furthermore, in the preceding practical embodiment, the coil comprises the first coil 52 and the second coil 54, but may alternatively comprise a single coil or three or more coils. Also, in the preceding practical embodiment, an active vibration damper is constituted by using the electromagnetic actuator 10. However, the present invention may also be implemented in an active actuator used for an active vibration damping device such as the one described in, for example, U.S. Publication No. US 2005/218734. Additionally, it is acceptable as long as the present invention has an actuator structure that utilize an electromagnetic force, and the present invention may also be implemented in an electromagnet-type active actuator that includes a mover made of a ferromagnetic material and drives the mover by exerting a magnetic attractive force thereon by utilizing a magnetic force generated due to energization to the coil, for example.

Also, in the preceding practical embodiment, the yoke member (the first and second yoke members 60, 62) is split into two yoke segments (the upper and first middle yoke segments 64, 66, the lower and second middle yoke segments 68, 70), but may alternatively be split into three or more yoke segments. Moreover, even in the case of being split into two, the split position is not limited to the mode of the preceding practical embodiment.

In the preceding practical embodiment, both the first yoke member 60 and the second yoke member 62 have a split structure, but it is acceptable as long as at least one of them has a split structure. Also, even when both the first yoke member and the second yoke member have a split structure, it is not necessary that the plurality of yoke segments that constitute both of the yoke members are all fixed by the mold resin. That is, the yoke segments that constitute one of the yoke members may be secured in a way of press-fitting as in the conventional structure, for example.

In addition, in the preceding practical embodiment, the first and second yoke members 60, 62 are mutually independent of each other, but are not limited to this embodiment. Specifically, a component that is common to the yoke segment constituting the first yoke member and the yoke segment constituting the second yoke member may be adopted, for example, by adopting a tubular yoke segment extending on the outer periphery of the first and second coils in the axial direction, or by forming the first middle yoke segment and the second middle yoke segment as an integral unit, or the like. When a tubular yoke segment extending on the outer periphery of the first and second coils in the axial direction is adopted, a through hole can be provided at a position corresponding to the gap 93a between the tube parts 86, 86 in the preceding practical embodiment, for example, and it is also possible to fill the inside of the yoke member with the mold resin via the through hole.

Besides, in the preceding practical embodiment, the resin bobbins 56, 56 and the first and second middle yoke segments 66, 70 are integrally formed as the primary molded component 82. However, the resin bobbins and the first and second middle yoke segments may be formed separately and then fixed later or attached later. Indeed, the resin bobbin is not essential, but an air-core coil may be adopted. In this case, for example, the entire periphery of the coil may be covered with the mold resin.

In the preceding practical embodiment, the upper and lower resin bobbins 56, 56 are linked by the linking resin 83 located in the notches 80, 80 provided in the outer peripheral edges of the first and second middle yoke segments 66, 70. However, instead of or in addition to this embodiment, for example, a through hole may be provided so as to vertically penetrate the radially middle portion of the first and second middle yoke segments, so that the upper and lower resin bobbins are mutually linked by the resin filling the through hole.

Furthermore, in the preceding practical embodiment, the mold resin 94 (the inside resin layer 96) filling the insides of the first and second yoke members 60, 62 is fixed to the resin bobbins 56, but it need not be fixed. That is, a gap may be provided between the coil wire and the mold resin (the inside resin layer).

In the preceding practical embodiment, a vehicle body is exemplified as the target member 12 whose vibration is to be damped. However, the electromagnetic actuator may be attached to a body other than the vehicle body, and an active vibration damper or an active vibration damping device for use in other than a vehicle may be constituted.

What is claimed is:

1. An electromagnetic actuator comprising:
   a mover;
   a stator;
   at least one coil provided to the stator and arranged on an outer periphery of the mover, the coil being configured to be energized to generate an electromagnetic force that exerts an axial driving force on the mover;
   at least one yoke member surrounding the coil, the yoke member being constituted by a plurality of yoke segments arranged so as to oppose each other in an axial direction of the coil with the coil interposed therebetween; and
   a mold resin filling a space between the yoke segments and the coil, the mold resin fixing the yoke segments to each other, wherein:
   the mold resin extends to an outer peripheral surface of the yoke member and forms an outside resin layer,
   at least one of the yoke segments includes an annular part protruding radially inward from a vertical outer end thereof, the coil includes a resin bobbin around which a coil wire is wound, and the mold resin fills a respective space between the annular part and the resin bobbin,
   an entire surface of the resin bobbin, which is on a side opposing the annular part in the axial direction of the coil, is held in contact via the mold resin with the annular part, and
   the plurality of yoke segments arranged so as to oppose each other in the axial direction of the coil, are opposed to each other in the axial direction via the mold resin without having abutting contact with another yoke segment in the axial direction in a part of an outer peripheral side of the coil in a circumferential direction.

2. The electromagnetic actuator according to claim 1, wherein the outside resin layer covers an entirety of the outer peripheral surface of the yoke member.

3. The electromagnetic actuator according to claim 1, wherein the mover comprises a mass member, and the stator includes an attachment to a target member whose vibration is to be damped such that the electromagnetic actuator constitutes an active vibration damper with respect to the target member.

4. The electromagnetic actuator according to claim 1, wherein
   the at least one coil of the stator comprises a first coil and a second coil overlapped with each other in an axial direction,
   the at least one yoke member comprises a first yoke member which is constituted by a plurality of yoke segments while surrounding the first coil, and a second yoke member which is constituted by a plurality of yoke segments while surrounding the second coil, and
   the plurality of yoke segments of the first yoke member and the plurality of yoke segments of the second yoke member are fixed to one another by the mold resin.

5. The electromagnetic actuator according to claim 1, wherein the yoke member includes a tube part located on an outer periphery of the coil, the tube part having a through hole, and the mold resin fills a radial inside of the tube part via the through hole.

6. The electromagnetic actuator according to claim 1, wherein the coil includes a power feed terminal that is conductive with respect to the coil wire, and a connector for external connection in which the power feed terminal is arranged is integrally formed by the mold resin.

7. The electromagnetic actuator according to claim 1, wherein the mold resin molded in a presence of the resin bobbin is fixed to the resin bobbin.

8. The electromagnetic actuator according to claim 1, wherein the entire surface of the resin bobbin, which is on the side opposing the annular part, is entirely covered by the annular part with the mold resin interposed in-between.

9. The electromagnetic actuator according to claim 1, wherein
a yoke segment of the plurality of yoke segments is arranged to oppose the annular part in the axial direction of the coil with the coil interposed therebetween, and is integrally formed with the resin bobbin.

10. The electromagnetic actuator according to claim 1, wherein
an entire inner surface of a yoke segment of the plurality of yoke segments, which is arranged to oppose the annular part in the axial direction of the coil with the coil interposed therebetween, directly contacts the resin bobbin.

\* \* \* \* \*